(12) United States Patent
Kubota

(10) Patent No.: US 6,168,851 B1
(45) Date of Patent: Jan. 2, 2001

(54) HOT-MELT WEBS, LAMINATES, AND LAMINATE MAKING METHOD

(75) Inventor: Yuichi Kubota, Tokyo (JP)

(73) Assignee: TDK Corporation, Tokyo (JP)

( * ) Notice: Under 35 U.S.C. 154(b), the term of this patent shall be extended for 0 days.

(21) Appl. No.: 09/037,034

(22) Filed: Mar. 9, 1998

(30) Foreign Application Priority Data

Mar. 14, 1997 (JP) .................................................. 9-081872
Dec. 17, 1997 (JP) .................................................. 9-364039

(51) Int. Cl.$^7$ ...................................................... B32B 7/12
(52) U.S. Cl. .................. 428/200; 428/349; 428/355 EN; 156/285; 156/327
(58) Field of Search ............................ 428/349, 355 EN, 428/200; 156/285, 327

(56) References Cited

U.S. PATENT DOCUMENTS 4,243,462 * 1/1981 Hori et al. ............................ 156/310
5,650,215 * 7/1997 Mazurek et al. ..................... 428/156

FOREIGN PATENT DOCUMENTS

198081 * 8/1989 (JP) .

OTHER PUBLICATIONS

Patent Abstracts of Japan, vol. 096, No. 007, Jul. 31, 1996, JP 08 072 202, Mar. 19, 1996.
Patent Abstracts of Japan, vol. 018, No. 478, Sep. 6, 1994, JP 06 160 626, Jun. 7, 1994.
Patent Abstracts of Japan, vol. 096, No. 002, Feb. 29, 1996, JP 07 261 023, Oct. 13, 1995.
Derwent Abstracts, AN 95 118 923, JP 07 041 753, Feb. 10, 1995.

* cited by examiner

Primary Examiner—Elizabeth M. Cole
(74) Attorney, Agent, or Firm—Oblon, Spivak, McClelland, Maier & Neustadt, P.C.

(57) ABSTRACT

A hot-melt web has a buffer adhesive layer of a thermosetting resin on a light transmissive, heat resistant resin support. The hot-melt web has the advantages of light transparency, heat resistance, weather resistance, controlled entrainment of bubbles and easy removal of bubbles during thermocompression bonding, provides a sufficient bonding force, and effectively corrects random deformations of a module sheet. The hot-melt web is suitable for use in the bonding, joining and laminating steps in the manufacture of optical discs such as DVD and flat panel displays, is easy to eliminate bubbles, and is effective for improving the quality of an associated product. A laminate using the hot-melt web and a method for preparing the laminate are also provided.

16 Claims, 2 Drawing Sheets

HOT-MELT WEBS, LAMINATES, AND LAMINATE MAKING METHOD

This invention relates to thermocompression bondable protective webs or hot-melt webs which are suited for the protection of members having flexibility, flatness or smoothness depending on the intended application and requiring light transparency, weather resistance and heat resistance or suited for the adhesive joint of components of optical recording media, flat panel displays or the like. It also relates to laminates comprising a member and a hot-melt web laminated thereto and a method for preparing the laminates.

BACKGROUND OF THE INVENTION

Research efforts have been made on the polymers used as protective members for module sheets requiring light transparency and weather resistance and having in themselves sufficient flexibility to enable winding and unwinding, typically solar cell module sheets.

For example, JP-A 198081/1989 discloses a solar cell module sheet wherein thin film solar cells are formed on a polymer film substrate and covered with a protective film layer with a buffer adhesive film layer of thermoplastic polymer interposed therebetween. This module sheet is an integrated amorphous silicon solar cell array having a sheet thickness of up to 1,000 $\mu$m and a flexural rigidity of up to 100 kg·mm$^2$, preferably up to 10 kg·mm$^2$, as measured with a 5-mm wide sample. The module sheet can be wound into a compact roll without damage to the solar cells when unnecessary, and spread flat when necessary. This solar array module sheet is flexible and repeatedly foldable.

The solar array module sheet of JP-A 198081/1989, however, is difficult to repeatedly wind into and unwind from a roll with a diameter of several centimeters because a flexural rigidity up to 100 kg-mm$^2$ is permissible. Although the buffer adhesive film layer of thermoplastic polymer intervenes between the protective film layer and the substrate, this module sheet has several problems. (1) It is less credible in environmental resistance when exposed for a long period of time to sunlight or other light sources during outdoor or indoor use. (2) Simply thermocompression bonding the protective film having a buffer adhesive layer to the thin film solar cell surface does not insure the evenness of the protective film and the transparency of a light receiving surface. (3) In thin film laminate devices including thin film solar cells using a polymer film as the substrate, functional thin films of amorphous silicon, ITO, aluminum alloy, etc. constituting the devices have a higher rigidity than the polymer material and also have different heat shrinkage factors and internal stresses during film formation. As a result, the module sheet undergoes random deformations which are practically impossible to correct.

(4) Bubbles can be introduced during thermocompression bonding. Even minute bubbles can grow into large bubbles with a rise of the service temperature of the device. Such bubble growth detracts from the outer appearance of the device, deteriorates the performance of the solar cells, and causes delamination of the protective film. More particularly, since the patterned surface of solar cells and the surface of thin film modules have numerous irregularities, bubbles are left in the shades of such irregularities after the lamination of the protective film layer. If directly exposed to sunlight, the bubbles expand to larger ones which can scatter the incident light to detract from the power generation capability (voltage-current characteristic or V-I curve), cause delamination and deteriorate the outer appearance. Additionally, moisture in the bubbles can accelerate the deterioration of the initial V-I curve in various environments.

Where a thermoplastic buffer adhesive layer is formed on a protective film as in the above example, the buffer adhesive layer experiences sensitive changes of its dynamic physical properties in response to changes of temperature and humidity in the outdoor or other service environment where the solar panel is used. For example, the light receiving surface is heated by sunlight or radiant heat from a suitable light source. As a result, the buffer adhesive layer lowers its viscosity or softens and fluidizes, detracting from the bond strength between the protective film and the solar cell surface and losing the rubbery elasticity necessary to withstand shrinkage stresses thermally induced in the protective film. This increases the contact resistance with the ITO electrode interface due to elastic deformation of the thin film and delamination of the surface electrode, deteriorates the power transducing capability, and lowers the protective film function causing cell damages. Conversely, at temperatures below the softening point, the thermoplastic buffer adhesive layer lowers its bonding force and hardens, losing the thin film device protecting function as the buffer layer to mitigate stress strain. The protective film function is likely to change in response to humidity changes.

In one example where a polyethylene terephthalate (PET) film having a glass transition temperature (Tg) of about 69° C. is used as the above protective film, when the light receiving surface is heated by direct exposure to sunlight, the film experiences substantial dimensional changes due to its thermal shrinkage and expansion. Since the buffer adhesive layer cannot accommodate these deformations, there is a tendency that stress strains are propagated to the solar cells, inducing performance deterioration and protective film delamination. It is then recommended that the device using PET film is limited to the application where the receiving surface avoids continuous direct exposure to sunlight or the indoor application where the receiving surface is exposed to fluorescent lamps and indirect lighting from incandescent lamps.

In thin film multilayer devices using films as the substrate, as typified by solar arrays and flexible printed circuit boards, the film substrates themselves are easy to work, for example, by punching or press working, fine through-hole drilling utilizing a YAG laser, etc., and laser scribing, as compared with glass substrates and metal substrates (e.g., SUS). This is advantageous in that thin film devices of three-dimensionally integrated compact design can be finished, without a need for leads, by drilling through-holes in the rear surface thereof and filling the holes with a conductive paste to form tapping electrodes on the rear surface.

When a process including the step of laying up many functional thin films by a vacuum process, the step of patterning the thin film surface to form a wiring electrode or interlayer insulating film by a screen printing process, and the step of forming a protective layer on the surface is considered with respect to productivity, the use of the substrate in the form of a continuous flexible film capable of bridging the respective steps is advantageous in throughput because the steps can be continuously carried out by virtue of a shorter tact time and the continuous feeding and handling of the substrate. Also, when the large scale integration or large scale mass production of thin film devices is considered, the use of the substrate in the form of a continuous flexible film is advantageous in throughput for the same reason.

Unlike the glass and SUS substrates, however, the flexible film substrates are not constant in "deflection," "wrinkle,"

"corrugation," "slack," and "thickness uniformity" when they are processed into thin film devices. Since productivity is lowered by the worsening of these conditions, the flattening and smoothing of flexible film substrates are crucial in order to produce consistent devices while minimizing the productivity lowering.

The manufacture of optical discs such as DVD-R involves the step of joining with a hot-melt or adhesive sheet. The adhesive requires spin coating, screen printing or otherwise coating and UV curing, adding to the number and time of steps. Polycarbonate substrates can be dissolved in or opacified by the solvent used for the coating purpose. Entrainment of bubbles adversely affects the optical properties or exacerbates the outer appearance of products.

Similar problems arise in the manufacture of liquid crystal panel displays, inorganic EL displays, and flat panel displays such as plasma diplay panels (PDP) and ECD. The manufacture process involves the step of laying and bonding functional films and the step of heating and fluidizing a polymer, both for the purposes of increasing luminance, recognition, visibility, environmental resistance, and contrast. In the step of laying and bonding functional films, for example, AR, LR, LG, deflector protective films, high viewing angle, high retardation, polarizing films, phase films, photoconductive diffusion films for back light, reflective multilayer films, transparent film electrodes, and lens sheet retainers and in the step of heating and fluidizing a polymer, for example, the injection of ferroelectric, high molecular weight, high boiling liquid crystals in a cell of a flexible liquid crystal module using a polymer film as the substrate, there arise similar problems.

SUMMARY OF THE INVENTION

An object of the invention is to provide a hot-melt web having improved light transparency, heat resistance and weather resistance, allowing less bubbles to be introduced or bubbles to be readily removed during thermocompression bonding, providing a sufficient bonding force, and effectively correcting random deformations of a module sheet; a laminate using the hot-melt web, typically a module sheet; and a method for preparing the laminate.

Another object of the invention is to provide a hot-melt web which is suitable for use in the bonding, joining and laminating steps in the manufacture of optical discs such as DVD and flat panel displays, contains less entrained bubbles, is easy to remove bubbles, and is effective for improving the quality of an associated product; a laminate using the hot-melt web, typically an optical disc or flat panel display; and a method for preparing the laminate.

In a first aspect, the invention provides a hot-melt web or stock comprising a support of a light transmissive, heat resistant resin and a buffer adhesive layer containing a thermosetting resin on at least one surface of the support. In one preferred embodiment, the buffer adhesive layer further contains an organic peroxide. The organic peroxide preferably has a decomposition temperature for the half life of 10 hours of at least 70° C. prior to thermocompression bonding. Preferably, the support has a glass transition temperature of at least 65° C. or a heat resistant temperature of at least 80° C. and a MOR value, representative of a degree of molecular orientation, of 1.0 to 3.0, prior to thermocompression bonding. The hot-melt web is often used for the covering of a member or the adhesion between members to form a laminate. The buffer adhesive layer may be embossed on its surface.

In a second aspect, the invention provides a laminate comprising a member and the hot-melt web laid thereon. The hot-melt web is typically thermocompression bonded to the member. Preferably, the buffer adhesive layer of the hot-melt web has a dynamic modulus of up to $5 \times 10^9$ dyn/cm$^2$ at 20° C. and at least $1 \times 10^6$ dyn/cm$^2$ at 100° C., a maximum peak value of tan δ in a temperature range of up to 20° C., and a thickness of 3 to 500 μm subsequent to the thermocompression bonding; and the support of the hot-melt web has a rate of change of its dynamic modulus within 30% at a temperature of 0° C. and/or 120° C. and a thickness of 5 to 100 μm subsequent to the thermocompression bonding. Also preferably, the member includes a substrate having a MOR value, representative of a degree of molecular orientation, of 1.0 to 3.0 prior to thermocompression bonding. The member is typically an optical disc, flat panel display or solar array.

In a third aspect, the invention provides a method for preparing a laminate comprising the steps of:

passing a hot-melt web and a member through a roll laminator for effecting thermocompression bonding to form a composite laminate, the hot-melt web comprising a buffer adhesive layer on at least one surface of a support of a light transmissive, heat resistant resin, with the buffer adhesive layer being in contact with the member;

cutting the composite laminate into sections, stacking the laminate sections, and placing the stack of laminate sections in a container; and heating and hydrostatic pressing the stack for achieving thermosetting and bubble removal.

The heating and pressing step preferably uses a heating temperature of at least 70° C. and a hydrostatic pressure of 3 to 15 kg/cm$^2$. When the stack of composite laminate sections is heated in the container, a substantially uniform mechanical pressure may be applied to the composite laminate sections in a direction perpendicular to the surfaces thereof, thereby achieving the bubble removal and flattening of the composite laminate sections. More specifically, a mechanical pressure of 0.01 to 5.0 kg/cm$^2$ is applied for flattening the composite laminate sections. Typically, the laminate preparing method of the invention uses the hot-melt web of the first aspect whereby the laminate of the second aspect is obtained.

BRIEF DESCRIPTION OF THE DRAWINGS

The above and other objects, features, and advantages will be better understood by reading the following description taken in conjunction with the accompanying drawings.

DESCRIPTION OF THE PREFERRED EMBODIMENT

Figure 1:
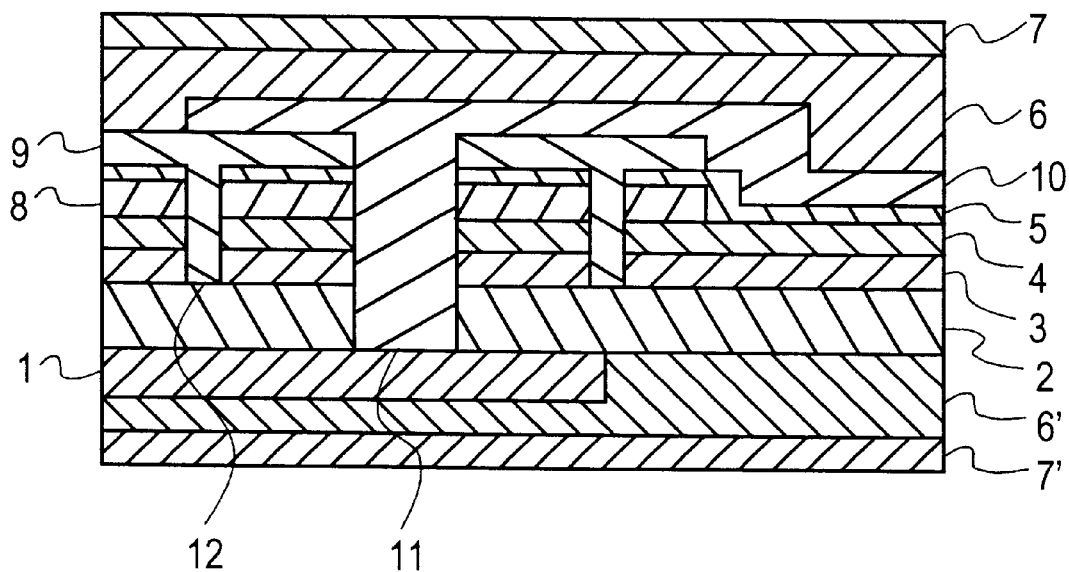
FIG. 1 is a schematic cross-sectional view showing the basic construction of a solar cell module prepared using the hot-melt web according to the invention.

The hot-melt web according to the invention has a buffer adhesive layer containing a thermosetting resin on at least one surface of a resinous support having light transparency and heat resistance.

Support

Since the buffer adhesive layer on the resinous support is formed of a thermosetting polymer having rubbery elasticity which is a flexible resin having a high crosslinking density among polymer molecular chains, the buffer adhesive layer experiences minimal changes of dynamic physical properties with temperature and humidity changes. The very slow changes of dynamic physical properties permit the buffer adhesive layer to maintain its function over a long period of time. Further, since a light transmissive resin film having a Tg of at least 65° C. and/or a heat resistant or continuous service temperature of at least 80° C. is used as the resinous protective film, the hot-melt web does not deteriorate even upon direct exposure to sunlight or other light sources.

The supports of light transmissive, heat resistant resins having a Tg of at least 65° C. and/or a heat resistant temperature (Tw) of at least 80° C. include fluororesin films, for example, homopolymers such as polyethylene terephthalate film (Tg 69° C.), heat resistant polyethylene naphthalate film (Tg 113° C.), polychlorotrifluoroethylene (PCTFE, Tw 150° C.) commercially available as Neoflon CTFE from Daikin Industry K.K., polyvinylidene fluoride (PVDF, Tw 150° C., Tg 50° C.) commercially available as Denda DX film from Denki Kagaku Kogyo K.K., and polyvinyl fluoride (PVF, Tw 100° C.) commercially available as Tedlar PVF film from E. I. dupont; and copolymers such as ethylene tetrafluoride-perfluorovinyl ether copolymers (PFA, Tw 260° C.) commercially available as Neoflon PFA film from Daikin Industry K.K., ethylene tetrafluoride-propylene hexafluoride copolymers (FEP, Tw 200° C.) commercially available as FEP type Toyoflon film from Toray K.K., and ethylene tetrafluoride-ethylene copolymers (ETFE) commercially available as Tefzel ETFE film (Tw 150° C.) from E. I. duPont and AFLEX film (Tg 83° C.) from Asahi Glass K.K.;

polyacrylate films such as aromatic dicarboxylic acid-bisphenol copolymerized aromatic polyesters (PAR castings, Tw 290° C., Tg 215° C.) commercially available as Elmeck from Kanegafuchi Chemical K.K.;

sulfurous polymer films such as polysulfone (PSF, Tg 190° C.) commercially available as Sumilite FS-1200 from Sumitomo Bakelite K.K., and polyether sulfone (PES, Tg 223° C.) commercially available as Sumilite FS-1300 from Sumitomo Bakelite K.K.;

polycarbonate films (PC, Tg 150° C.) commercially available as Panlite from Teijin Chemicals K.K.;

functional norbornene resins (Tw 164° C., Tg 171° C.) commercially available as ARTON from Nippon Synthetic Rubber K.K.;

polymethyl methacrylate resins (PMMA, Tg 93° C.);

olefin-maleimide copolymers (Tg≧150° C.) commercially available as TI-160 from Toso K.K., para-aramide (Tw 200° C.) commercially available as Aramica R from Asahi Chemicals K.K., fluorinated polyimides (Tw≧200° C.), polystyrene (Tg 90° C.), polyvinyl chloride (Tg 70–80° C.), and cellulose triacetate (Tg 107° C.).

Of these, the heat resistant polyethylene naphthalate film (Tg 113° C.) is preferable to the PET film because it is superior in heat resistance in terms of Tg, heat resistance during long term service, Young's modulus (or stiffness), rupture strength, heat shrinkage factor, low oligomer content, gas barrier, hydrolytic resistance, moisture permeability, temperature coefficient of expansion, and photo-degradation of physical properties. As compared with other polymers, the polyethylene naphthalate film has a good overall profile of rupture strength, heat resistance, dimensional stability, moisture permeability and cost.

The resinous support should have a glass transition temperature (Tg) of at least 65° C., preferably at least 70° C., more preferably at least 80° C., most preferably at least 110° C. The upper limit of Tg is not critical although it is usually about 130° C. The heat resistant or continuous service temperature should be at least 80° C., preferably at least 100° C., more preferably at least 110° C. The upper limit of the heat resistant temperature is not critical, but the higher the better, and is usually about 250° C. The thickness of the resinous support is properly determined in accordance with the parameters of a member to be laminated therewith and the strength and flexural rigidity required for the support although it is usually about 5 to 100 μm, preferably about 20 to 90 μm. A resinous support with a thickness of less than 5 μm would achieve less effective surface protection and a hot-melt web obtained by applying an adhesive layer thereto would be liable to deform. A resinous support with a thickness of more than 100 μm would have a low light transmittance and become less amenable to lamination in a roll form and hence, obstruct continuous manufacture.

The resinous support should preferably have a rate of change of its dynamic modulus within 30%, more preferably within 20% at a temperature of 0° C. and/or 120° C. subsequent to thermocompression bonding. The magnitude of dynamic modulus is preferably in the range of $1\times10^9$ to $1\times10^{12}$ dyn/cm². If the rate of change of dynamic modulus between 0° C. and 120° C. after thermocompression bonding is in excess of 30%, internal stresses would be generated in excess of the buffer action of the buffer adhesive layer, causing a lowering of bonding force, peeling of the hot-melt web, and deformation of the laminate.

By the term "light transmissive" resin of the support, it is meant that at least 70%, preferably at least 80% of light in the visible range is transmitted by the support.

The resinous support should preferably have a MOR value, representative of a degree of molecular orientation, of 1.0 to 3.0, more preferably 1.0 to 2.0, especially 1.0 to 1.8. MOR values within this range ensure that the laminate is little deformed. Note that MOR is an abbreviation of molecular orientation ratio. The MOR value representative of a degree of molecular orientation is described in Convertech, March 1998, Shigeyoshi Osaki, "Quality Control of Film Sheets Using Microwave Molecular Orientation Meter" and Seikei-Kakou, Vol. 17, No. 11, 1995, Y. Zushi, T. Niwa, S. Hibi, S. Nagata, and T. Tani, "Molecular Orientation Behavior On Biaxial Stretching." Larger MOR values indicate greater anisotropy, with a MOR value of 1.0 indicating random anisotropy.

As to the degree of molecular orientation, a single resinous film may have different MOR values at different sites. Especially in the event of a biaxially stretched film, the film tends to exhibit a higher degree of molecular orientation at its edge where it has been secured during stretching. On account of this tendency, it is recommended that even when a film is made of a resin normally having a satisfactory degree of molecular orientation, the film should be examined for a degree of molecular orientation at several sites and confirmed to have degrees of molecular orientation within the desired range before it can be used in the invention.

Measurement of MOR is made, for example, by directing microwave to a rotating sample and measuring the intensity of transmitted microwave. More particularly, the interaction between the microwave electric field with a certain frequency and dipoles of the polymer is correlated to the inner product of their vectors. When the sample is rotated in the microwave polarization electric field, the intensity of transmitted microwave changes due to the anisotropy of dielectric constant, from which a degree of molecular orientation can be ascertained. The microwave used in this measurement is not critical although it usually has a frequency of 4

GHz or 12 GHz. The meter for measuring a degree of molecular orientation utilizing this principle is commercially available as molecular orientation meters MOA-5001A, 5012A, 3001A and 3012A from Shin-Oji Paper K.K. Alternatively, MOR values may be determined by x-ray diffraction, infrared dichroic, polarization fluoroscopic, ultrasonic, optical and NMR analyses.

Preferably the MOR value in the above-defined range should also hold for a component of a member to which the hot-melt web is to be applied, for example, a flexible substrate.

Buffer Adhesive Layer

The buffer adhesive layer contains a thermosetting resin and an organic peroxide. Typical thermosetting resins are ethylene-vinyl acetate copolymers (EVA) having a vinyl acetate content of about 15 to 50% by weight.

The organic peroxide may be selected from those compounds which decompose to generate radicals at temperatures above 80° C., especially above 90° C. With the stability of organic peroxide upon blending taken into account, it should preferably have a decomposition temperature, which provides a half-life of 10 hours, of at least 70° C. Examples of the organic peroxide for thermosetting resins include 2,5-dimethylhexane-2,5-dihydroperoxide, 2,5-dimethyl-2,5-di(t-butylperoxy)hexane-3, di-t-butylperoxide, 2,5-dimethyl-2,5-di(t-butylperoxy)hexane, dicumyl peroxide, α,α-bis(t-butylperoxyisopropyl)-benzene, n-butyl-4,4-bis(t-butylperoxy)valerate, 2,2-bis(t-butylperoxy)butane, 1,1-bis (t-butylperoxy)-3,3,5-trimethyl-cyclohexane, t-butylperoxybenzoate, and benzoyl peroxide. These peroxides may be used alone or as a mixture of two or more in any desired mix ratio. The amount of the organic peroxide blended is preferably less than 10 parts, more preferably 0.5 to 6 parts by weight per 100 parts by weight of the thermosetting resin.

If desired, additives such as curing promoters may be added. In one exemplary embodiment wherein the hot-melt web is laid on a member to form a laminate, an organosilane compound represented by the structure: $RSi(OR)_3$ wherein R is alkyl such as $C_2H_5$ may be blended in an amount of less than 6 parts by weight on the same basis as an anti-foaming agent or foam inhibitor in the buffer adhesive layer. In the heating/compressing step, the organosiloxane compound reacts with the organic peroxide to generate free radicals, which become a crosslinking agent for the ethylene-vinyl acetate copolymer base and are thus eventually incorporated in the buffer adhesive layer. The organosiloxane compound has the additional function of facilitating the separation of the buffer adhesive layer when the hot-melt web is stored in a roll form or as a stack of sections.

The thickness of the buffer adhesive layer may be adjusted appropriate in accordance with the type of organic peroxide, the service environment, and the member to which the hot-melt web is laminated. Preferably the buffer adhesive layer has a thickness of about 3 to 500 µm. more preferably about 3 to 50 µm, most preferably about 10 to 40 µm. A buffer adhesive layer of thinner than 3 µm would exert a less buffer effect whereas a buffer adhesive layer of thicker than 500 µm would cause a lowering of light transmittance and tend to leave fins upon punching. It is noted that since the adhesive layer is far more light transmissive than the support, a thickness of up to 10,000 µm is acceptable for outdoor service or use under a high illuminance source. The buffer adhesive layer should preferably have a dynamic modulus of up to $5 \times 10^9$ dyn/cm² at 20° C. and at least $1 \times 10^6$ dyn/cm² at 100° C., more preferably $1 \times 10^9$ to $1 \times 10^6$ dyn/cm² at 20° C. and $2 \times 10^6$ to $1 \times 10^9$ dyn/cm² at 100° C., after thermocompression bonding. Also the buffer adhesive layer should preferably have a maximum peak value of tan δ in a temperature range of up to 20° C., more preferably in a range of −100° C. to +15° C., after thermocompression bonding.

Hot-Melt Web

Particularly when the hot-melt web is used as a laminate protective film, the buffer adhesive layer is provided on only one surface of the resinous support. When a solar cell substrate and a laminate film support have a great difference in thermal shrinkage factor upon heating because of the material difference, as will be described later, the buffer adhesive layer is provided on either surface of the resinous support so that the cell laminate becomes flat. The double side web is advantageous for outdoor use in a rigorous environment. When the hot-melt web is used as joining means in the manufacture of optical recording media and flat panel displays, as will be described later, the buffer adhesive layer is provided on either surface of the resinous support. In the double side web, the resinous support and the buffer adhesive layers should preferably be thinner within the above-described thickness ranges. The buffer adhesive layer may also be used as a separate sheet of 4 to 6 mm thick.

The buffer adhesive layer is provided on the resinous support by any well-known means such as coating or extrusion coating. The total thickness of the resinous support and the buffer adhesive layer or layers is preferably in the range of 10 to 600 µm, more preferably 10 to 120 µm, further preferably 30 to 90 µm, most preferably 60 to 80 µm.

In the hot-melt web according to the invention, the buffer adhesive layer is preferably embossed on its surface. Particularly when the hot-melt web is subject to pressure lamination, it is preferred to form the emboss pattern, especially as a pattern of streaks extending in the same direction as the feed direction during lamination. When the hot-melt web is used for laminating members, the direction of the emboss pattern is arbitrary. An optimum direction may be selected for the emboss pattern in accordance with the laminating direction or the type of members to be laminated. The embossing or the formation of steaks affords bubble escape passages, minimizing the entrainment of bubbles. Particularly when pressure lamination is carried out by a roll laminator by wrapping a film around the laminator roll and feeding a member thereto with the aid of the nipple roll, bubbles will find a way of easy escape in the laminating direction. The size, spacing and population of streaks to be formed by embossment are not critical. For example, the buffer adhesive layer is preferably embossed to a surface roughness Ra of 0.4 to 10 µm, more preferably 0.6 to 0.8 µm and an average peak-to-peak spacing of 50 to 180 µm, more preferably 60 to 140 µm. The embossing means is not critical and conventional embossing techniques may be used. Alternatively, a release film is once embossed and that emboss pattern is transferred to the buffer adhesive layer.

Laminate

According to the invention, the above-described hot-melt web is laid on a member to form a laminate.

Referring to FIG. 1, there is illustrated one exemplary construction of the laminate using the hot-melt web according to the invention. FIG. 1 is a schematic cross-sectional view showing the basic construction of a solar cell module which is one exemplary embodiment of the laminate of the invention. The solar cell module sheet includes on a flexible substrate 2, a lower electrode 3 of aluminum, an amorphous silicon layer 4, an interlayer insulating film 8 (formed by printing a first urethane base insulating resin composition), a transparent electrode film 5 of indium tin oxide (ITO), via holes 12, a separator 9 (formed by printing a second urethane base insulating resin composition), a wiring electrode 10, and a through-hole 11. Further included are a tapping positive electrode 1 (formed by screen printing a silver paste on the rear surface) and a tapping negative electrode (not shown).

A hot-melt web consisting of a buffer adhesive layer 6 on a support 7 is laid on the solar cell module sheet. When the solar cell module is used outdoor, or when it is desired to prevent the ingress of moisture and dust or to protect against corrosion, a similar hot-melt web consisting of a buffer adhesive layer 6' on a support 7' may be provided at the lower side of the solar cell module sheet. The integral lamination of the buffer adhesive layer 6 and the support 7 is effective for working efficiency because the flexible rubber sheet-like adhesive layer 6 can be handled together with the support 7. The integral lamination is also effective for preventing dimensional changes with time during working caused by the relaxation of internal strains in the buffer adhesive layer 6.

Next, the method for preparing such a sheet module which is one embodiment of the laminate according to the invention. There are furnished the hot-melt web having a buffer adhesive layer on at least one surface of a light transmissive, heat resistant resin support having a Tg of at least 65° C. and a member to be laminated, typically a solar array sheet having an upper or light receiving surface to be protected. The hot-melt web is laid on the member such that the buffer adhesive layer of the web is in close contact with the light receiving surface of the member. This assembly is passed through a roll laminator where thermocompression bonding is carried out, preferably at a temperature of 100 to 120° C. and a linear pressure of 20 to 70 g/cm. A composite sheet is obtained in this way. Although reference is mainly made to a one-side laminate having only one hot-melt web laid on a member, a double-side laminate having hot-melt webs on opposite sides of a member may also be employed depending on the type of a member to be laminated and the service environment. In the case of the double-side laminate, a sandwich of a member between hot-melt webs, with the buffer adhesive layers faced to the member, may be passed through a roll laminator for achieving thermocompression bonding.

The composite sheet thus obtained is then cut to sections of predetermined dimensions. The sheet sections are stacked and received in a container equipped with heating and compressing means, typically an autoclave. Preferably in a dry air or nitrogen atmosphere, especially in a nitrogen atmosphere, a substantially uniform mechanical pressure of 0.01 to 5.0 kg, especially 0.1 to 5.0 kg is applied to the stack of sheet sections in a direction perpendicular to the major surfaces of the sheet sections, typically in a vertical direction while the stack is heated at a temperature of at least 70° C., especially 140 to 180° C. The pressure applied during heating is 3 to 15 kg/cm$^2$. This heat pressing is continued for about 30 to 120 minutes for achieving heat crosslinking, deaeration and a firm bond, producing a laminate according to the invention. The heating temperature and hydrostatic pressure applied by the heating and compressing means may be adjusted in accordance with the particular member and hot-melt web employed. The mechanical pressure may be applied at any desired timing. Preferably the pressure is maintained even after heating and until cooling to room temperature. One preferred procedure involves the step of bubble removal by heating above the curing temperature of the adhesive layer, more preferably at a temperature of 70 to 100° C., applying a pressure of 5 to 10 kg/cm$^2$, and maintaining the temperature and pressure for 15 to 60 minutes, and the subsequent step of thermosetting by heating at a higher temperature, more preferably at a temperature of 100 to 170° C., especially 120 to 170° C. and maintaining the pressure of 3 to 15 kg/cm$^2$, especially 5 to 10 kg/cm$^2$ at the temperature for a further 15 to 60 minutes.

Since the lamination is carried out by means of a roll laminator, the influence of irregularities on the member to be laminated, for example, a fine pattern of comb-shaped electrodes on a solar cell array or a fine pattern of insulator for cell isolation is minimized. More particularly, the member/hot-melt web assembly is fed to a roll laminator while the structured surface of the member is in contact with the buffer adhesive layer which is heated to a more fluidized state. The assembly is clamped between the elastic rolls of the laminator while it is moved forward. The bubbles which are probably left in the shades of pattern lines on the structured surface are effectively expelled out by the hydraulic forces acting thereon due to the sliding stresses produced between the elastic rolls.

Residual bubbles which are not completely removed by the roll laminator are removed in the subsequent heat crosslinking step by the heating and compressing means. At the thermocompression bonding stage, it is preferred that a heat resistant elastomer sheet is laid on the upper (light receiving) surface of each composite sheet section and a metal cover plate is laid thereon. A plurality of metal cover plate/elastomer sheet/composite sheet section units are placed one on top of the other. A mechanical pressure is vertically applied to the stack via a high rigidity, flat smooth platen of SUS or the like by a compressing means such as a pneumatic cylinder. In this way, the module sheet having a functional thin film on a plastic substrate which has been randomly deformed by the thermal contraction and internal stresses of the functional thin film is laminated with the hot-melt web into a device which is now corrected to be smooth and flat.

It is understood that the member to be laminated consists of plural different components which are different in rigidity and thickness, for example, amorphous silicon, ITO, aluminum alloy, interlayer insulating films, and sealing insulating protective film in the event of a solar array. By applying a mechanical pressure to the (green) laminate sections lying in the above-described layer structure in the heat crosslinking step by heating and compression, the components are laminated and integrated with the hot-melt web so that random deformations contained in the composite sheet whose layers have different heat shrinkage factors and internal stresses at the end of their formation may be readily corrected. Additionally, since the stack of plural composite sheet sections is heat pressed, flattening correction can be simultaneously carried out on a plurality of sheet sections, which is advantageous for mass production. As compared with coating, the lamination of the hot-melt web is effective in endowing the surface with superior flatness and smoothness, resulting in products having a good outer appearance. This adds to the commodity value of products.

The heat resistant elastomer sheet used in the heat compression step is not critical insofar as it withstands the heating temperature. A choice may be made of well-known heat resistant elastomers, for example, heat resistant silicone rubber, fluoro-rubber (e.g., Viton® by dupont), and fluoro-silicone rubber. The thickness of the heat resistant elastomer sheet is not critical although it is usually about 0.5 to 10 mm.

The metal cover plate also used in the heat compression step may be made of aluminum, brass, steel or stainless steel. Aluminum is preferable because of its light weight and high thermal conductivity. The thickness of the cover plate is not critical although it is usually about 0.2 to 3 mm. The cover plate may be surface treated by well-known means, for example, aluminum anodizing, plating such as chromium, nickel or nickel—chromium plating, or paint coating.

The hot-melt web of the invention is also useful in joining a structural member to a flat panel display such as a liquid crystal panel display or inorganic EL panel display.

Figure 2:
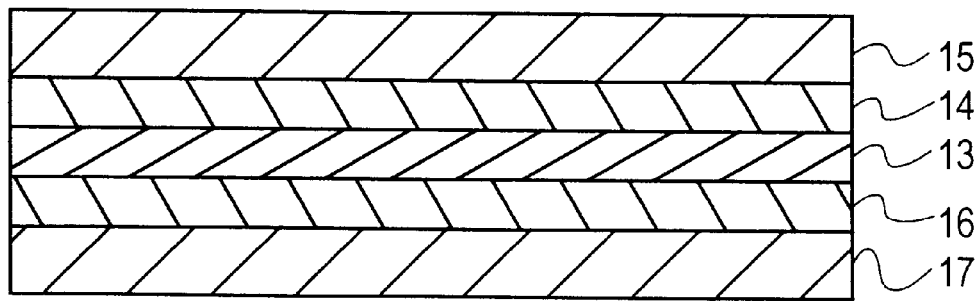
FIG. 2 is a schematic cross-sectional view showing the basic construction of a liquid crystal cell according to the invention.

FIG. 2 illustrates in cross section the basic construction of a liquid crystal panel display (sometimes referred to as a liquid crystal cell) to which the invention is applicable.

The liquid crystal cell illustrated in FIG. 2 includes an upper substrate 15, an upper electrode 14, a liquid crystal layer 13, a lower electrode 16, and a lower substrate 17, laid from top to bottom in the described order. The liquid crystal cell is further provided on its top surface with a structural member, for example, a functional film (e.g., a polarization film, phase film or anti-glare film) or a protective film. The hot-melt web of the invention is advantageously used in joining the structural member to the liquid crystal cell.

The upper and lower substrates 15 and 17 of the liquid crystal cell may be made of glass, plastic or resin materials or metals. A choice may be made among these materials in accordance with the required properties of the liquid crystal panel display and other components. In most cases, transparent materials are preferable because a desired light transmittance at a certain wavelength band is necessary. The substrate(s) may have been provided with a transparent electrode of ITO or a patterned electrode.

The upper and lower electrodes 14 and 16 each may be a transparent electrode of ITO (tin-doped indium oxide) or IZO (zinc-doped indium oxide), a metal or metal oxide electrode having a controlled thickness, or a combination of a transparent electrode and a metal electrode.

For the liquid crystal layer 13, a choice may be made of well-known compounds which are used in conventional liquid crystal display devices. Exemplary liquid crystals include acrylate main chain liquid crystal polymers, methacrylate main chain liquid crystal polymers, chloroacrylate main chain liquid crystal polymers, oxirane main chain liquid crystal polymers, cyclohexane main chain liquid crystal polymers, ester main chain liquid crystal polymers, twisted nematic (TN) liquid crystals, and ferroelectric polymer liquid crystals having a chiral smectic C or H phase, as described in JP-A 318526/1988, 20981/1990, and 81626/1991.

The hot-melt web of the invention is also applicable to the inorganic EL flat panel display.

The inorganic EL flat panel display is constructed, for example, by forming an inorganic light-emitting layer such as a diamond-like carbon (DLC) thin film doped with a desired element on a transparent substrate or between transparent substrates along with metal, metal oxide or transparent electrodes. On the flat panel display, the hot-melt web of the invention is laid as a protective film.

The application of the hot-melt web of the invention to the flat panel display may be done as described above for the solar array. Since the flat panel display requires little flattening, there is no need to apply a mechanical pressure.

The hot-melt web of the invention is also useful in sticking of optical discs such as DVD-R.

Reference is made to optical discs of the dye type, for example. A substrate is disc-shaped and has a diameter of about 64 to 200 mm and a thickness of about 0.6 to 1.2 mm. The substrate is made of a resin or glass which is substantially transparent to write/read light so that write/read operation may be made from the back side of the substrate. By the term "substantially transparent to write/read light," it is meant that the substrate has a transmittance of at least 88% to light having a wavelength of about 500 to 900 nm, specifically about 600 to 800 nm, more specifically about 630 to 690 nm.

More particularly, the substrate is typically made of resins, preferably thermoplastic resins such as polycarbonate resins, acrylic resins, amorphous polyolefins and polystyrene resins. Using such resins, substrates are formed by well-known techniques such as injection molding. Tracking grooves are usually formed on the major surface of the substrate to bear the recording layer. Preferably the grooves are formed simultaneous with molding. Alternatively, a grooved resin layer formed by a 2P (photopolymerization) technique may be attached to a preformed substrate. Glass substrates are also useful as the case may be.

On the grooved major surface of the substrate, a recording layer in the form of a dye layer is formed. The dye may be selected from dyes of various skeletons, for example, cyanine dyes, thiazole dyes, oxazole dyes, imidazole dyes, quinoline dyes, pyrimidine dyes, indolenine dyes, and benzoindolenine dyes. A mixture of such dyes may also be used if necessary to provide the necessary absorption maximum wavelength. The dye or dyes are dissolved in a suitable solvent to form a solution which is applied to the substrate. The coating solution may contain a stabilizer, binder, dispersant and other additives.

A reflective layer is formed on the substrate in close contact with the recording layer. The reflective layer may be made of a high reflectance metal or alloy such as Au, Ag, Cu or AgCu. The reflective layer may consist of two or more layers of such metals. Its thickness is preferably 500 angstroms or more. The reflective layer may be formed by evaporation or sputtering.

A protective layer is often formed on the reflective layer. The protective layer may be formed from various resins such as UV-curable resins to a thickness of about 0.5 to 100 $\mu$m. The protective layer may be either a coating or a sheet. In the case of a coating, it is formed by conventional techniques such as spin coating, gravure coating, spray coating, and dipping.

The DVD-R is of the dual lamination disc structure. Each substrate of 0.6 mm thick (usually of polycarbonate resin) is provided with the above-mentioned layers. Two these substrates are joined with the hot-melt web of the invention such that the protective layers are faced to each other.

Typically, the groove has a depth of 0.1 to 0.25 $\mu$m, a width of 0.2 to 0.4 $\mu$m, and a pitch of 0.5 to 1.0 $\mu$m. The recording layer has a thickness of 500 to 3,000 angstrom and a complex index of refraction of n=2.0 to 2.6 and k=0.02 to 0.20 at 635 nm.

Of course, the optical disc may be of the phase change type or magneto-optical type.

The optical disc is not limited to the optical recording disc of the close contact type mentioned above. The invention is applicable to any optical disc requiring the joining of two substrates, with equivalent results being expectable.

EXAMPLE

Examples of the invention are given below by way of illustration and not by way of limitation.

Example 1

Figure 3:
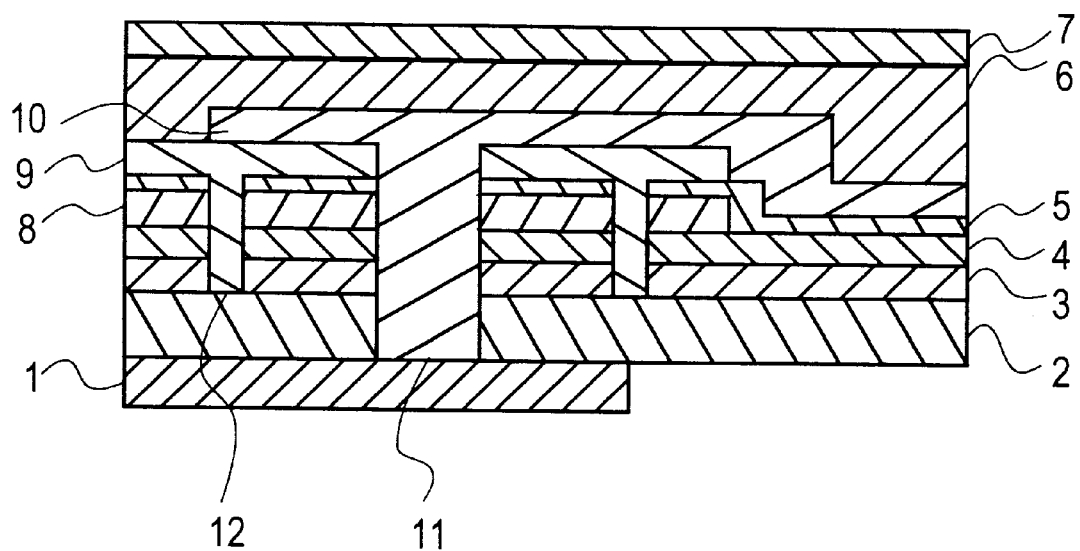
FIG. 3 is a schematic cross-sectional view showing the basic construction of a solar cell module prepared in Example 1.

A solar cell module sheet of the construction shown in FIG. 3 was fabricated. First, a lower electrode 3 of aluminum (or dual layers of aluminum and stainless steel) was formed on a flexible substrate 2 of polyethylene naphthalate (PEN) film. A photovoltaic amorphous silicon layer 4 having PIN junctions was formed thereon by a plasma CVD technique. Using a 150-mesh polyester screen, a first urethane base insulating resin composition was printed and patterned on the surface of the amorphous silicon layer 4, followed by drying and heat curing in an oven at 160° C. for 10 minutes to form an interlayer insulating film 8. An ITO transparent electrode film 5 was formed thereon by a sputtering technique using indium tin oxide (ITO) as the target and argon sputtering gas. By laser drilling using a YAG laser, holes including via hole 12 for isolation and electrical connection and through holes 11 (only one shown) are formed through the interlayer insulating film 8, ITO transparent electrode 5, amorphous silicon layer 4, and lower electrode 3. Next, a second urethane base insulating resin composition was screen printed on the via hole 12 to form a separator 9 for providing insulation between the lower electrode 3 and the ITO transparent electrode 5. A conductive silver paste was printed thereon to form a wiring electrode 10. At the same time, the through-hole 11 which was extended through the substrate 2 by the laser drilling was filled with the conductive silver paste. Finally, a silver electrode was screen printed on the rear surface of the substrate 2 so as to contact the conductive silver paste in the through-hole, forming a positive tapping electrode 1 and a negative tapping electrode (not shown).

Separately, a hot-melt web was prepared. A heat resistant polyethylene naphthalate film of 50 $\mu$m thick (Tg 113° C.) was furnished as a light transmissive, heat resistant, flexible resin support 7. An adhesive composition containing 100 parts by weight of an ethylene-vinyl acetate copolymer resin (EVA, vinyl acetate content 15 to 50% by weight), 7 parts by weight of dicumyl peroxide as a curing agent, and minor amounts of additives such as a curing promoter and ethyltriethoxysilane (for providing deaeration and release capabilities) was coated on one surface of the support 7 to a thickness of 20 $\mu$m, forming a buffer adhesive layer 6. The surface of the buffer adhesive layer was embossed to a desired surface roughness. The measurements by a surface roughness meter were Ra=0.65 $\mu$m, Rz (ISO)=2.65 $\mu$m, Sm=128 $\mu$m, and S=37 $\mu$m. The hot-melt web was completed in this way.

The hot-melt web was laid on the solar array module sheet such that the buffer adhesive layer of the web was in contact with the light-receiving surface (on the ITO transparent electrode 5 side) of the module sheet. The web and the module sheet were continuously fed through a roll laminator, that is, between hot elastic rolls where they were thermocompression bonded at a temperature of 110° C. and a linear pressure of 40 g/cm. The composite sheet was taken up in a roll form. A composite solar cell module sheet was obtained in this way.

The composite solar cell module sheet was cut into sections of predetermined dimensions. A heat resistant silicone rubber sheet having an approximately equal size and a thickness of 5 mm was laid on the light receiving surface (protective resin film 7 side) of each section, and an aluminum cover plate of like dimensions was laid thereon, forming a ply assembly. A stack of thirty (30) ply assemblies was placed between stainless steel plates in an autoclave. The upper stainless steel plate was coupled to a pneumatic cylinder. The autoclave was purged with nitrogen gas.

A pressure of 0.3 kg/cm$^2$ was applied to the top of the stack by means of the pneumatic cylinder while the autoclave was heated to 90° C., held thereat for 30 minutes, and further heated to 150° C. and held thereat for 45 minutes. There were obtained solar cell module sheet sections which are typical laminates according to the invention. The internal stress was 7 kg/cm$^2$.

The thus obtained 30 solar cell module sheet sections were visually inspected, confirming the absence of bubbles, a satisfactory outer appearance, and the very firm adhesion of the hot-melt web to the light-receiving surface of the solar cell module sheet owing to thermosetting. Each section was examined for battery characteristics before and after an accelerated aging test. The battery characteristics including Isc, Voc, Iope, and FF were measured under the conditions shown below. Each sample was aged for 1,000 hours in environments of −40° C., 85° C./RH 85%, and 105° C. A percent change of the battery characteristic before and after the aging was calculated.

Measurement

High illuminance characteristics were measured by a V-I curve test according to JIS C-8914 under a 50,000-lux xenon lamp approximate to AM 1.5.

Low illuminance characteristics were measured by a V-I curve test under a 200-lux incandescent lamp.

The changes of Isc, Voc, Iope, and FF were within ±0.10% in any of the environments of −40° C., 85° C./RH 85%, and 105° C., indicating good environmental aging stability. The solar cell module sheet flattened by the mechanical pressure showed a warpage of ±0.1 mm from a reference plane when rested on a platen. That is, the solar array of this example was fully resistant to warpage, indicating extremely superior shape stability as a solar cell module using a resin substrate.

Example 2

Preparation of Liquid Crystal Panel Display

A hot-melt web was prepared as in Example 1 except that a buffer adhesive layer of 30 $\mu$m thick was formed on either surface of a resinous support of 50 $\mu$m thick.

A liquid crystal panel display of the structure shown in FIG. 2 was prepared by forming ITO transparent electrodes on glass substrates, and mating the substrates such that a ferroelectric liquid crystal layer was interleaved between the transparent electrodes.

Using the double-side hot-melt web, a polarizing film was joined to either surface of this liquid crystal cell. In this way, thirty (30) liquid crystal cell samples were prepared.

The samples were stacked and placed in a container which was placed in an autoclave.

The autoclave was closed, purged with nitrogen gas, heat to 90° C. and held thereat for 45 minutes, completing liquid panel displays. The internal stress was 5 kg/cm$^2$.

The 30 liquid panel displays were visually inspected, finding no bubbles.

Example 3

Preparation of Liquid Crystal Panel Display

In Example 2, after the polarizing films were joined to the liquid crystal cell, a phase film and an anti-glare film were attached to one surface (display side) of the liquid crystal cell using the double-side hot-melt webs. In this way, thirty (30) liquid crystal cell samples were prepared.

The samples were subject to the heating/compressing step as in Example 2. The thus obtained 30 liquid panel displays were examined as in Example 2, finding equivalent results.

Example 4

Preparation of Inorganic EL Panel Display

A hot-melt web prepared as in Example 1 was joined to an inorganic EL cell by thermocompression bonding as in Example 1. Without applying a pressure by means of a pneumatic cylinder, the cell units were sealingly placed in an autoclave which was purged with nitrogen gas and heated to 130° C. and held thereat for 45 minutes. In this way, thirty (30) inorganic EL panel display samples were prepared. The internal stress was 5 kg/cm$^2$.

The 30 inorganic EL panel display samples were visually inspected, finding no bubbles.

Example 5
Preparation of Optical Recording Disc (DVD-R)

A hot-melt web was prepared as in Example 1 except that a buffer adhesive layer of 30 μm thick was formed on either surface of a resinous support of 38 μm thick.

A polycarbonate resin was injection molded into a disc substrate having a diameter of 120 mm and a thickness of 0.6 mm. At the same time as molding, the surface of the substrate to bear the recording layer was provided with tracking grooves having a width of 0.35 μm and a depth of 100 nm at a pitch of 0.8 μm.

A recording layer of a cyanine dye for DVD-R was formed on the polycarbonate resin substrate. The coating solution contained 1.2% by weight of the cyanine dye in 2,2,3,3-tetrafluoropropanol. The recording layer was 1,000 Å (100 nm) thick. A reflective gold film of 850 Å thick was formed on the recording layer by sputtering. A transparent protective film of UV curable acrylic resin was formed thereon to a thickness of 5 μm. Using the double-side hot-melt web cut to the same shape as the substrate, two such substrates were joined such that the protective films were inside. In this way, fifty (50) disc samples were prepared.

A heat resistant silicone rubber sheet having an approximately equal size (slightly smaller diameter) and a thickness of 3 mm was laid on the front surface (write/read side) of the disc sample, and an aluminum cover plate having an approximately equal size was laid thereon, forming a ply assembly. A stack of fifty (50) ply assemblies was placed between stainless steel plates in an autoclave. The stainless steel plates were lined with heat resistant silicone rubber for disc protection, and the upper plate was coupled to a pneumatic cylinder. The autoclave was purged with nitrogen gas and closed.

A pressure of 4 kg/cm$^2$ was applied to the top of the stack by means of the pneumatic cylinder while the autoclave was heated to 140° C. and held thereat for 45 minutes. There were obtained optical discs which are typical laminates according to the invention. The internal stress was 9 kg/cm$^2$.

The 50 optical disc samples were visually inspected, finding no bubbles.

Comparative Example 1

Solar cell modules were fabricated as in Example 1 except for the following differences. The hot-melt web used had the buffer adhesive layer which contained only an ethylene-vinyl acetate copolymer resin, but not the organic peroxide curing agent. The web and the module sheet were thermocompression bonded through a roll laminator at a temperature of 160° C. and a linear pressure of 80 g/cm. The subsequent heating/compressing step was omitted.

The thus obtained 30 samples were visually observed as in Example 1. In 23 samples among the 30 samples, there were found linear bubbles of 0.6 to 0.1 mm wide located in the shades of the silver surface electrodes and isolation lines of cells in a transverse direction and round bubbles having a diameter of about 3 mm located at intersections between the wiring electrodes at the periphery of cells and the insulating resin, though in a sparse distribution.

An accelerated aging test was carried out as in Example 1. The percent failure of Iope (more than 10% drop) was in excess of 65% even in the environment of 85° C./RH 85%, indicating significantly lower environmental storage stability than in Example 1. On account of the heat applied during the aging test, bubbles covered 40% of the surface of the composite solar array module. The warpage of the module was as large as 0.8 mm on the average.

Comparative Example 2

Solar cell modules were fabricated as in Example 1 except for the following differences. The hot-melt web used had the buffer adhesive layer which contained Vyron-300 and trimethylolpropane adduct trifunctional isocyanate Colonate HL. The web and the module sheet were thermocompression bonded through a roll laminator at a temperature of 160° C. and a linear pressure of 80 g/cm. In the subsequent heating/compressing step, curing was effected at 150° C. for 30 minutes.

The thus obtained 30 samples were visually observed as in Example 1. In all the samples, bubbles which were expanded to a diameter of 6 mm or more due to the heat of the thermosetting step were distributed over the entire surface of the module.

An accelerated aging test was carried out as in Example 1. The percent failure of Iope was 52% even in the environment of 85° C./RH 85%, indicating significantly lower environmental storage stability than in Example 1. On account of the heat applied during the aging test, the bubbles further expanded. The warpage of the module was as large as 0.8 mm on the average.

Comparative Example 3

Solar cell modules were fabricated as in Example 1 except for the following differences. The hot-melt web used had the support of a PET film and the buffer adhesive layer which contained an ethylene-methacrylate copolymer resin, Vyron-300 and HDI trifunctional isocyanate crosslinking agent Colonate HL. The web and the module sheet were thermocompression bonded through a roll laminator at a temperature of 160° C. and a linear pressure of 80 g/cm. The subsequent heating/compressing step was omitted.

The thus obtained 30 samples were visually observed as in Example 1, finding bubbles in several samples as in Comparative Example 1.

An accelerated aging test was carried out as in Example 1. Among the 30 samples, 24 samples ceased to produce an output at 500 hours of aging in the environment of 85° C./RH 85% when Iope was measured under the high illuminance condition. The remaining 6 samples showed an Iope decline to 20% of the initial level. On account of the heat applied during the aging test, the bubbles further expanded. The warpage of the module was as large as 3 mm on the average, indicating that the solar array module was significantly deformed by the thermal shrinkage of the PET film. This indicates that the PET film is inappropriate in the application which requires strict environmental stability as represented by the accelerated aging test and that the PET film should be used in limited applications. The heat resistance and moisture resistance of the buffer adhesive layer are presumed inferior to Example 1.

Comparative Example 4

While the hot-melt web and the solar cell module sheet used were the same as in Example 1, the web and the module sheet were joined without using a roll laminator. More particularly, the web was laid on the module sheet such that the buffer adhesive layer was in contact with the light receiving surface of the solar cell module sheet. Lamination was carried out using a double-plate vacuum laminator whose heating plates were set at a temperature of 130° C. While evacuating the system, the members were pre-bonded at 95° C. for 15 minutes and then fully bonded at 130° C. for 30 minutes. A crosslinkable EVA sheet of 200 μm thick was punched to the size of the solar cell module sheet. Because of the flexible rubber sheet, it underwent dimensional changes with time due to relaxation of internal stresses. The step of sandwiching the EVA sheet between the PEN film and the solar cell sheet in register therewith was cumbersome and time consuming.

The thus obtained 30 samples were visually observed as in Example 1. In all the 30 samples, there were found bubbles located along the silver electrodes and isolation lines in moving and transverse directions as in Comparative Example 1, and the peripheral bubbles expanded in the confined state. The buffer adhesive layer underwent dimensional changes with time during the lay-up and vacuum lamination steps, causing the cell surface to be locally exposed along the edges of the solar cell module.

An accelerated aging test was carried out as in Example 1. The percent failure of Iope was in excess of 65% in the environment of 85° C./RH 85%, indicating significantly lower environmental storage stability than in Example 1. On account of the heat applied during the aging test, the bubbles further expanded. The warpage of the module was as large as 0.8 mm on the average.

Comparative Example 5

Optical discs were prepared as in Example 5 except for the following differences. An ethylene-ethyl methacrylate copolymer was used in the buffer adhesive layer. In the heating/compressing step, no mechanical pressure was applied, and the autoclave was closed, purged with dry air, heated at 140° C. and held thereat for 45 minutes. The internal stress was 9 kg/cm$^2$.

The 50 optical disc samples were visually inspected as in Example 5. In 36 samples of the 50 samples, sparsely distributed bubbles were found.

It is evident from the foregoing results that a hot-melt web having a thermosetting resin buffer adhesive layer on a heat resistant film support eliminates the cumbersome step of individually laying the layer and the support, prevents dimensional deformation of the buffer adhesive layer, has light transparency, heat resistance and weather resistance, prevents entrainment of bubbles during thermocompression bonding to a module sheet, allows for easy removal of bubbles, achieves a satisfactory bond strength, and effectively corrects random deformations of a module sheet. The use of the hot-melt web according to the invention permits highly reliable solar array or similar modules to be produced using roll or similar laminators which are more efficient in operation and more complete in bubble removal than conventional vacuum laminators. By virtue of the hot-melt web according to the invention, the joining step in the manufacture of optical recording media (e.g., DVD-R) and flat panel displays becomes more efficient, minimizes entrainment of bubbles, and allows for easy removal of bubbles.

Example 6

Solar array modules were prepared as in Example 1 except for the following differences. PEN films of 50 μm thick having different degrees of molecular orientation were used as the support of the hot-melt web. The solar array module was of approximately disc shape having a diameter of about 14 mm.

The degree of molecular orientation was measured using MOA-3001A from Shin-Oji Paper K.K. and a microwave having a frequency of 4 GHz, measuring the intensity of microwave over 360° at intervals of 1°, determining a ratio of microwave intensities as a degree of molecular orientation, and selecting as a typical value an MOR value which is an index indicating the degree of anisotropy. Measurement was made on two test specimens taken from the sample at two different positions.

The resulting solar array modules were measured for warpage. Those samples whose warpage exceeded the standard were rejected and the yield (or proportion) of passed samples was determined. More particularly, a weight (diameter about 24 mm, thickness about 1.5 mm, weight about 76 g) was placed at one end of a solar array module resting on a flat plate, and the distance of the other end of the module kept apart from the flat plate due to warpage was measured. The warpage was one-half of this distance. The warpage of 0.8 mm was the standard. Also, approximately isotropic PEN films of 75 μm thick having a degree of molecular orientation given by an MOR value of 1.24 were commonly used as the flexible substrate of the solar array module sheets which were used in the fabrication of the solar array modules as a member to be laminated. A comparison was made using films having different MOR values as the support of the hot-melt web. The results are shown in Table 1.

TABLE 1

| Sample No. | MOR (specimen 1) | MOR (specimen 2) | Yield (%) |
|---|---|---|---|
| 1 | 1.257 | 1.333 | 100 |
| 2 | 1.222 | 1.227 | 100 |
| 3 | 4.061 | 3.661 | 38.5 |

A comparison was also made with respect to the PEN film of 75 μm thick which was the flexible substrate of the solar array module sheets used (in the fabrication of the solar array modules) as a member to be laminated. Using PEN films having different degrees of molecular orientation (different MOR values), solar array modules were fabricated as in Example 1. They were examined as above. Approximately isotropic PEN films of 50 μm thick having a degree of molecular orientation given by an MOR value of 1.20 were commonly used as the support of the hot-melt webs. Lamination and flattening were carried out as in Example 1. The solar array modules using substrates having different MOR values were examined for comparison. The results are shown in Table 2.

TABLE 2

| Sample No. | MOR (specimen 1) | MOR (specimen 2) | Yield (%) |
|---|---|---|---|
| 11 | 1.695 | 1.401 | 100 |
| 12 | 1.240 | 1.708 | 100 |
| 13 | 3.435 | 2.786 | 60–70 |

It is evident from Tables 1 and 2 that samples using supports or substrates having a MOR value in the range of 1.0 to 3.0 are improved in flatness and yield due to the minimized warpage.

Measurement of a degree of molecular orientation was made on resin films other than PEN, including an aramide film of 50 μm thick (Aramica 50RO by Asahi Chemicals K.K.), a PVF film of 50 μm thick (Tedlar by E. I. duPont), an ETFE film of 50 μm thick (Aflex by Asahi Glass K.K.), and a polycarbonate film of 50 μm (Panlite by Teijin Chemicals K.K.). The aramide film had MOR values of 1.18 and 1.16; the PVF film had MOR values of 2.201 and 3.078; the ETFE film had MOR values of 1.009 and 0.998; and the polycarbonate film had MOR values of 1.038 and 1.032. It is evident from these results that the films formed from polymer solutions by T-die extrusion or casting were approximately isotropic, which permits the flattening step to be effective in the manufacture of film laminates. However, the PVF film which has been stretched tends to undergo deformations like warpage of the laminate on account of the two-dimensional non-uniformity of thermal contraction and expansion based on the anisotropy of the film itself.

When a solar cell module laminate is fabricated using a PEN film as the substrate of a solar cell module sheet and a weather resistant ETFE (Aflex by Asahi Glass K.K., thickness 50 μm, easily bondable CS treated ETFE, Tg 83° C.) as the support of a hot-melt web, the buffer adhesive layer cannot fully accommodate thermal shrinkage strains in the step of laminating PEN and ETFE, because of the great difference in thermal shrinkage factor upon heating (the shrinkage of ETFE is three times the shrinkage of PEN upon heating at 150° C. for 30 minutes). Therefore, in such a case, the cell module was also provided at the opposite side with a similar buffer adhesive layer and support (ETFE), and the laminate-sealed cell assembly covered with ETFE on both sides was subject to pressing in a direction perpendicular to the cell surface using a roll laminator and an autoclave as used in Example 1. This corrected the substantial warpage or deformation caused by the great difference in thermal shrinkage between PEN and ETFE, resulting in a completely flat, weather resistant cell assembly completely sealed with laminates on top and bottom sides. Equivalent results were obtained when a ETFE support having an aluminum foil interleaved is used. Leads were connected to positive and negative electrodes projecting from the sealed layer in the cell assembly so that a photovoltaic potential might be taken out. The cell assembly was evaluated for weather resistance by an accelerated test of placing the cell assembly in a sunshine weatherometer using a xenon lamp. In the accelerated deterioration test corresponding to 5 years of outdoor exposure, no substantial changes of Isc, Voc, Iope and FF as measured in Example 1 were found because all the changes were within ±10%. The cell assembly was also free of deterioration of flatness by physical changes.

There have been described a hot-melt web which has improved light transparency, heat resistance and weather resistance, allows less bubbles to be introduced or bubbles to be readily removed during thermocompression bonding, provides a sufficient bonding force, and effectively corrects random deformations of a module sheet; a laminate using the hot-melt web, typically a module sheet; and a method for preparing the laminate. The hot-melt web is suitable for use in the joining step in the manufacture of optical recording discs such as DVD-R and flat panel displays, contains less entrained bubbles, and is easy to eliminate bubbles.

Reasonable modifications and variations are possible from the foregoing disclosure without departing from either the spirit or scope of the present invention as defined by the claims.

What is claimed is:

1. A hot-melt web comprising
   a support of a light transmissive, heat resistant resin and
   a buffer adhesive layer containing a thermosetting resin and an organic peroxide blended therewith, on at least one surface of the support.

2. A hot-melt web according to claim 1 wherein said support has a glass transition temperature of at least 65° C. or a heat resistant temperature of at least 80° C. prior to thermocompression bonding.

3. The hot-melt web according to claim 1 wherein said support has a MOR value, representative of a degree of molecular orientation, of 1.0 to 3.0 prior to thermocompression bonding.

4. The hot-melt web according to claim 1 wherein said organic peroxide has a decomposition temperature of at least 70° C. for the half life of 10 hours prior to thermocompression bonding.

5. The hot-melt web according to claim 1 wherein said buffer adhesive layer is embossed on its surface.

6. A laminate comprising a member and a hot-melt web according to claim 1 laid thereon.

7. A laminate according to claim 6 wherein the hot-melt web has been thermocompression bonded to the member, the buffer adhesive layer of said hot-melt web has a dynamic modulus of up to $5 \times 10^9$ dyn/cm$^2$ at 20° C. and at least $1 \times 10^6$ dyn/cm$^2$ at 100° C., a maximum peak value of tan δ in a temperature range of up to 20° C., and a thickness of 3 to 500 μm subsequent to the thermocompression bonding.

8. A laminate according to claim 6 wherein the hot-melt web has been thermocompression bonded to the member, the support of said hot-melt web has a rate of change of its dynamic modulus within 30% at a temperature of 0° C. and/or 120° C. and a thickness of 5 to 100 μm subsequent to the thermocompression bonding.

9. A laminate according to claim 6 wherein said member includes a substrate having a molecular orientation ratio (MOR) value, representative of a degree of molecular orientation, of 1.0 to 3.0 prior to thermocompression bonding.

10. A laminate according to claim 6 wherein said member is an optical disc, flat panel display or solar array.

11. A laminate comprising a member and a hot-melt web laid thereon, wherein said member is an optical disc, flat panel display or solar array, wherein said hot-melt web comprises
   a support of a light transmissive, heat resistant resin and
   a buffer adhesive layer containing a thermosetting resin on at least one surface of the support, wherein said buffer adhesive layer further contains an organic peroxide.

12. A method for preparing a laminate comprising the steps of:
   passing a hot-melt web and a member through a roll laminator for effecting thermocompression bonding to form a composite laminate, said hot-melt web comprising a buffer adhesive layer on at least one surface of a support of a light transmissive, heat resistant resin, with the buffer adhesive layer being in contact with the member, cutting the composite laminate into sections, stacking the laminate sections, and placing the stack of laminate sections in a container, and heating and hydrostatic pressing the stack for achieving thermosetting and bubble removal, wherein the buffer adhesive layer of said hot-melt web contains a thermosetting resin and an organic peroxide blended therewith.

13. A method for preparing a laminate according to claim 12 wherein the heating and pressing step uses a heating temperature of at least 70° C.

14. A method for preparing a laminate according to claim 12 wherein the heating and pressing step uses a hydrostatic pressure of 3 to 15 kg/cm$^2$.

15. The method for preparing a laminate according to claim 12 wherein when the stack of composite laminate sections is heated in the container, a substantially uniform mechanical pressure is applied to the composite laminate sections in a direction perpendicular to the surfaces thereof, thereby achieving the bubble removal and flattening of the composite laminate sections.

16. The method for preparing a laminate according to claim 15 wherein a mechanical pressure of 0.01 to 5.0 kg/cm$^2$ is applied for flattening the composite laminate sections.

* * * * *

UNITED STATES PATENT AND TRADEMARK OFFICE
CERTIFICATE OF CORRECTION

PATENT NO.    : 6,168,851 B1
DATED         : January 2, 2001
INVENTOR(S)   : Yuichi Kubota It is certified that error appears in the above-identified patent and that said Letters Patent is hereby corrected as shown below:

<u>Title page,</u>
Item [30], the 3rd Foreign Application Priority Data has been omitted. Item [30] should read as follows:

[30] Foreign Application Priority Data

Mar. 14, 1997   (JP).................................................9-081872
Dec. 17, 1997   (JP).................................................9-364039
Feb. 19, 1998   (JP)................................................10-054498

Signed and Sealed this

Twenty-third Day of October, 2001

Attest:

NICHOLAS P. GODICI
Attesting Officer     Acting Director of the United States Patent and Trademark Office